Oct. 14, 1969

A. HAHN 3,472,392

MOBILE FOOD SERVICE WAGON

Filed Oct. 4, 1967

INVENTOR
ARTHUR HAHN
BY Seidel & Gonda

ATTORNEYS.

Oct. 14, 1969  A. HAHN  3,472,392
MOBILE FOOD SERVICE WAGON
Filed Oct. 4, 1967  2 Sheets-Sheet 2

INVENTOR
ARTHUR HAHN
BY
ATTORNEYS.

United States Patent Office 3,472,392
Patented Oct. 14, 1969

3,472,392
MOBILE FOOD SERVICE WAGON
Arthur Hahn, 4000 Ridge Pike,
Collegeville, Pa. 19426
Filed Oct. 4, 1967, Ser. No. 672,911
Int. Cl. A47j 47/14; B62b 3/00, 11/00
U.S. Cl. 211—126                              9 Claims

ABSTRACT OF THE DISCLOSURE

A food service wagon having a frame mounted on wheels and having a plurality of posts extending upwardly from the frame defining a plurality of openings adapted to receive dishes. An inverted U-shaped housing is secured to the frame. A tray for receiving silverware is supported by the top of the U-shaped housing and a plurality of trays are adapted to be received on supports within the U-shaped housing. Openings are provided in the top tray supported on a U-shaped housing, on the top of the U-shaped housing and in the bottom frame member to permit the flow of material therethrough. A receptacle is provided beneath the base of the wagon for receiving garbage and a further receptacle is provided on the side of the wagon for receipt of other materials such as paper and/or linen. A readily removable cylindrical receptacle is provided for receiving scrapings from plates.

---

This invention is directed to a mobile food service wagon and more particularly to a mobile food service wagon which reduces the number of personnel needed to remove servings from tables and eliminates the necessity for providing service stands.

Conventionally, in restaurants, numerous service stations are provided to facilitate the removal of tableware, soiled linen, and the like. Usually, aluminum trays are provided at the service stations and plates, glasses, cups, and silverware are indiscriminately heaped upon the trays. Thereafter, the aluminum tray must be carried by personnel from the service station into the kitchen. Often, silverware is lost by being mixed with garbage on the trays. Furthermore, significant breaking and chipping of plates, glasses, cups, etc. occurs because of the indiscriminate piling of such materials on a service station tray.

A further undesirable result of utilizing a single tray at a service station is that garbage is constantly mixed in with the dishes and silverware since all materials remaining on the table are placed on a single tray.

It is an object of the present invention to provide a mobile food service wagon for use in a restaurant which overcomes the deficiencies above noted.

It is another object of the present invention to provide a mobile food service wagon which provides for rapid separation of silverware, trash, glasses and dishes in a neat manner.

It is a further object of the present invention to provide a mobile food service wagon which facilitates draining of glassware, silverware and cups into a garbage compartment.

It is still another object of the present invention to provide a mobile food service wagon which promotes stacking of silverware, glasses and cups into trays which may be placed directly into a dishwasher.

It is still another object of the present invention to provide a mobile food service wagon which is attractive in appearance and which can be used in all types of restaurants.

It is yet a still further object of the present invention to provide a mobile food service wagon which can be used for filling service stands with a supply of new silverware, glasses, dishes, etc.

Other objects will appear hereinafter.

The above and other objects are accomplished by means of the present invention. A mobile food service wagon is provided which has a frame including a base member mounted on wheels. A plurality of posts extend upwardly from the base and define various size openings therebetween. The openings between the posts are adapted to receive various size dishes. An inverted U-shaped housing is also secured to the base. The top of the U-shaped housing is open which permits flow of material therethrough. A slight recess is provided on the top of U-shaped housing so that a silverware tray may be mounted and held in place thereon. The silverware tray has a screen mesh bottom to promote flow of material therethrough. The silverware tray is adapted to be removed from the wagon and placed directly into a dishwasher to minimize handling.

The interior side walls of the U-shaped housing are provided with a plurality of supports. The supports are adapted to retain glass or cup trays thereon. The glass and cup trays are also adapted to be removed from the mobile service unit and placed directly into a dishwasher. The glass and cup trays do not have tops and have screen mesh bottoms therein to permit the flow of material therethrough. Beneath the U-shaped housing the base of the service tray has openings therein. Beneath the base of the service tray a garbage receiving unit is provided. The garbage receiving unit is adapted to receive any liquid material which may still be in the cups or glasses or any material on the silverware. The openings in the base of of the tray permits such material to flow into the garbage receiving unit.

A paper and linen disposal container is removably attached to the wagon at one end thereof. Means are also provided for maintaining the wagon in a stationary position while the same is being loaded.

For the purpose of illustrating the invention, there is shown in the drawings a form which is presently preferred; it being understood, however, that this invention is not limited to the precise arrangements and instrumentalities shown.

Figure 1:
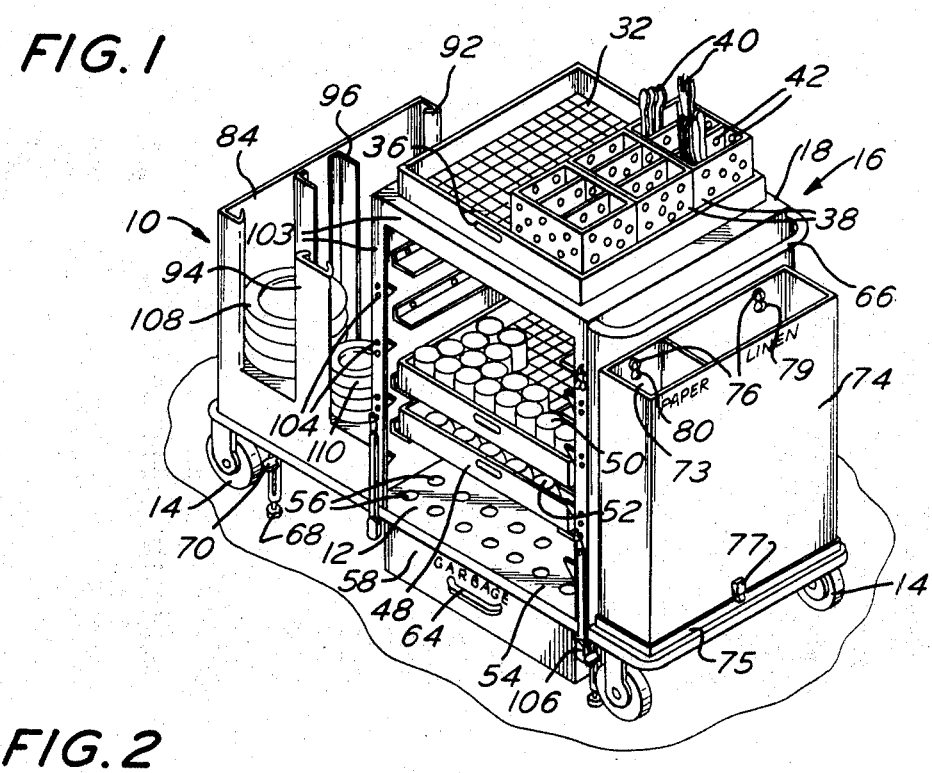
FIGURE 1 is a perspective view of a mobile food service wagon partially loaded and constructed in accordance with the present invention.
Figure 2:
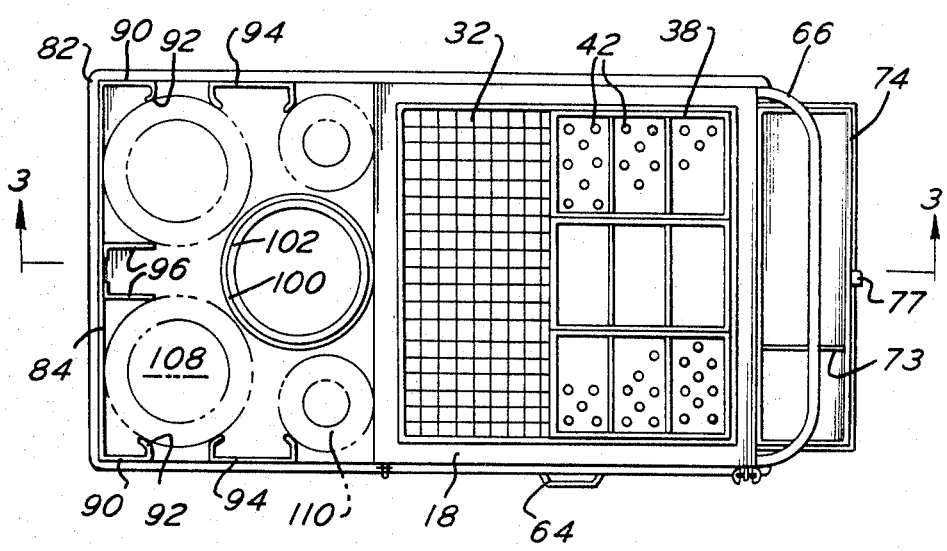
FIGURE 2 is a top plan view of FIGURE 1.
Figure 3:
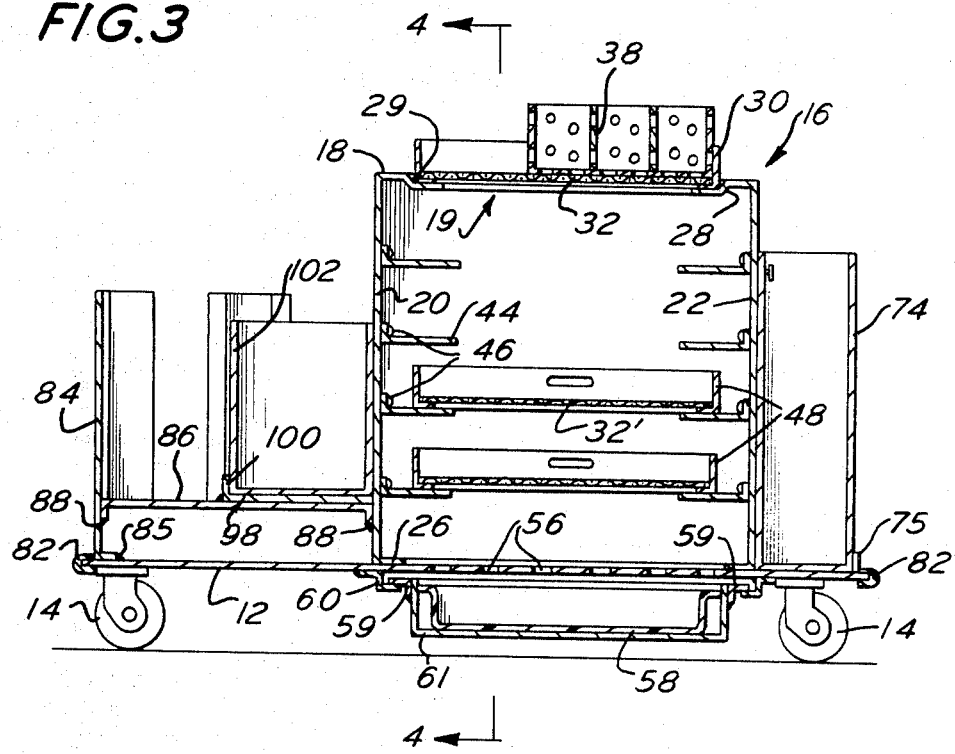
FIGURE 3 is a section view taken along 3—3 of FIGURE 2.
Figure 4:
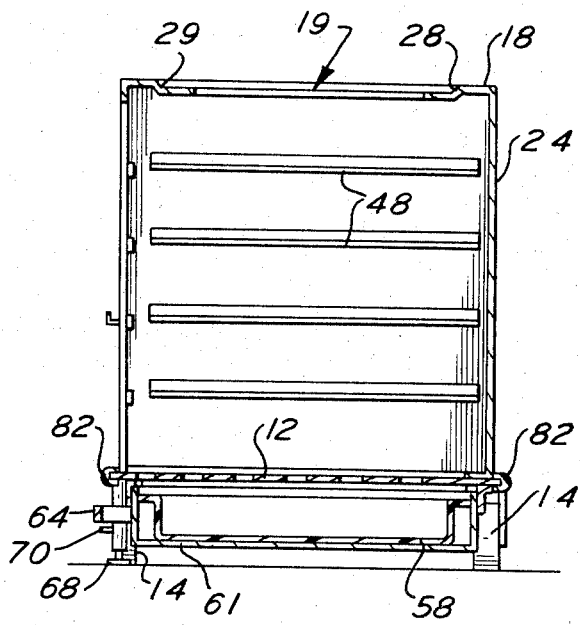
FIGURE 4 is a section view taken along line 4—4 of FIGURE 2.

Referring now to the drawings in detail wherein like reference numerals indicate like elements throughout the several views, there is set forth in FIGURES 1–4 a mobile food service wagon indicated generally by the reference numeral 10.

The wagon 10 has a frame including a base member 12 which has wheels 14 secured thereto. Thus, the wagon 10 is readily movable to any desired location. An inverted U-shaped housing 16 is supported on the base 12. The housing 16 includes a top 18 having a centrally located opening 19 therein. The housing 16 has side walls 20 and 22. The housing 16 may be provided with a back wall 24. Alternatively, the back of the housing 16 may be substantially open to facilitate the removal of trays from either the front or back of the housing as will be set forth in detail hereinafter. The front of the housing 16 is substantially open. A flange 26 extends around the base of the housing 16 and facilitates secure interconnection of the housing 16 to the base 12. The flange 26 can be secured to the base 12 by means of rivets, bolts, or the like.

The top 18 of the housing 16 has a stepped portion 28 thereon to provide a recess 29 for receipt of a tray 30. The tray 30 will be received within the recess 29 and be prevented from movement by the side walls of the stepped portion 28.

The tray 30 has a screen mesh base 32 and upstanding walls 34. The screen mesh 32 is coarse and permits the flow of material therethrough. The tray 30 is provided with slots 36 to facilitate rapid removal of the tray from the recess 29 defined by the stepped portion 28 of the housing 16.

Receptacles 38 are adapted to be received in the tray 30. The receptacles 38 are adapted to receive silverware 40 therein. Holes 42 are provided in the bottom and side walls of the receptacles 38 which permit flow of material therethrough. Thus, material remaining on the silverware placed in the receptacles is permitted to drain downwardly through the receptacles and through the open top 19 of the housing 16.

L-shaped flanges or guides 44 are secured to the side walls 20 and 22 of the housing 16. Suitable fastening means 46, such as rivets, bolts or the like, may be utilized to secure the guides 44. Trays 48 are adapted to be received upon and supported by the guides 44. The trays 48 are identical to the tray 30 in all respects. The trays 30 and 48 are preferably the type which are utilized in automatic dishwashing apparatus. Hence, the trays may be readily removed from the wagon 10 and placed into a dishwasher or vice versa. The trays 48 are adapted to receive glasses 50, cups 52, or the like. Since the trays 48 and the tray 30 are identical in structure, structure corresponding to that already identified with respect to tray 30 will be indicated on tray 48 with the same reference numerals having a prime notation. The bottom 32' of the trays 48 are composed of a coarse screen mesh and permit material to flow therethrough.

In the preferred use of the wagon 10, cups and glasses and the like are inverted when placed in the trays 48 to facilitate draining of the same. The portion 54 of the base 12 located immediately beneath the housing 16 has a plurality of openings 56 therein. The openings 56 permit flow of material therethrough. If desired, the base 12 could be separated into two distinct sections and the portion 54 could be a coarse mesh screen similar to the screen 32 on the tray 30.

A garbage compartment 58 is supported by the underside of the base 54. Z-shaped supports 60 are welded at 62 to the underside of the base 54. The garbage compartment 58 has a handle 64 thereon which facilitates removal of the garbage compartment from the wagon 10. The supports 60 receive angle brackets 59 welded or otherwise secured to a housing 61. The compartment 58 is received within the housing 61. The brackets 59 may be removably connected to the supports 60 so that the housing 61 can be readily removed and cleaned. It is readily seen that material on silverware, cups, glasses, or the like is drained into the garbage compartment 58. Such drainage is provided for by the holes 42 and the silverware receptacles 38, the screen mesh 32 in the tray 30, the opening 19 in the top of housing 16, the screen mesh 32' in the trays 48, and the openings 56 in the base 54.

A handle 66 is suitably secured to the exterior surface of the top of the housing 16 and facilitates movement of the wagon 10. When it is desired to locate the wagon 10 in a stationary position it is merely necessary to lower the foot actuable stops 68 to their lowermost position. An abutment 70 is provided on the stops 68 to permit the stops to be easily lowered by the foot of an operator. The stops 68 extend slightly beyond the lowest reach of the wheels 14 and thus prevent the wheels from engaging the ground and also prevent the wagon from rolling. To release the stops 68 it is merely necessary for an operator to slightly rotate the abutment 70 and permit the stops 68 to be raised by a spring contained therein. Stops 68 are conventional and need not be further discussed herein.

A paper and linen receptacle 74 is removably attached to the outside of the side wall 22 of the housing 16. The receptacle 74 may have a partition 73 therein to divide the receptacle into separate compartments so that the paper and linen may be segregated. Screws or bolts 76 may extend from the outside of wall 22 to provide support for the receptacle 74. The base 12 extends beyond wall 22 of the housing 16 and also provides support for the receptacle 74. An upstanding flange 75 is secured to the base 12 and prevents the receptacle 74 from shifting once it is in its desired position. A buckle fastener 77 of conventional construction may also be provided to connect the receptacle 74 to the flange 75. The receptacle 74 has slots 79 therein which cooperate with the screws 76. The slots 79 have enlarged portions 80 which facilitate rapid removal of the receptacle 74 from the wagon 10. It is readily seen that the receptacle may be positioned against the outside of the wall 22 of the housing 16 so that the screws 76 extend through the enlarged portions 80 of the slots 79 and is thereafter dropped into position so that the narrow portions of the slots 79 will prevent the receptacle 74 from pivoting about the flange 76. Hence, an effective and rapidly removable interconnection between the receptacle 74 and the wagon 10 is provided.

A guard 82 which may be composed of plastic, rubber or the like, is attached to the base 12 around the entire periphery thereof. The guard 82 has a generally C shape and is frictionally retained on the base 12. The guard 82 prevents damage to furniture in the restaurant should the wagon 10 be accidentally pushed against an article of furniture.

An end wall 84 is securely connected to the base 12 of the wagon 10. The end wall 84 may be connected to the base 12 by a weldment 85 or the like. A shelf member 86 is connected, at one end, to the end wall 84 and, at its other end, to the side wall 20 of the U-shaped housing 16. The shelf member is connected by means of weldments 88 or the like. The shelf member 86 is provided so that dishes will be stacked on a higher platform and thus minimize bending by the user of the wagon 10. The shelf 86 may be provided with a layer of sponge rubber on the top surface thereof in order to minimize breakage of dishes.

The end wall 84 has extensions 90 extending in a direction perpendicular thereto. Inwardly directed chordal segments 92 are integrally connected to the extensions 90 for a purpose which will become clear hereinafter.

A pair of C-shaped posts 94 extend upwardly from the shelf member 86. The posts 94 are positioned closer to the wall 20 than the end wall 84. The spacing of the posts 94 provides for dishes of various sizes to be supported by the shelf member 86. L-shaped posts 96 also extend upwardly from the shelf member 86. The posts 94 and 96 may be welded or secured to the shelf 86 by any other suitable means.

A circular plate 98 is also secured to the shelf member 86. The circular plate 98 has an upstanding flange 100. A cylindrical receptacle 102 is removably supported by the plate 98 and prevented from tipping or otherwise moving by the flange 100. Dishes which are to be placed on the shelf member 86 may have any material thereon scraped off into the cylindrical receptacle 102. The outer surface of the cylindrical receptacle 102 cooperates with the posts 94 and the side wall 20 to define two spaces wherein small dishes 110 may be stacked. The exterior surface of the cylindrical receptacle 102 also cooperates with the posts 94, chordal segments 92 and L-shaped posts 96 to define two spaces wherein large dishes 108 may be stacked. It can be readily observed that the spacing of the C-shaped posts 94 is important in order to accurately define spacing for the dishes 108 and 110.

The U-shaped housing 16 may also be provided with flanges 103 which lie in a plane perpendicular to the planes encompassing the side walls 20 and 22. The flanges 103 may be provided with holes 104. The holes 104 may be used for attaching cleaning utensils 106 to the wagon 10.

While the wagon 10 has been described as being particularly suitable for use in restaurants, it is to be understood that this invention is not limited to any particular end use of the wagon.

The present invention may be embodied in other specific forms without departing from the spirit or essential attributes thereof and, accordingly, reference should be made to the appended claims, rather than to the foregoing specification as indicating the scope of the invention.

I claim:

1. A mobile food service wagon comprising a frame including a base mounted on wheels, a plurality of upwardly extending posts supported by said base, said posts partially defining various size openings therebetween for accommodating plates of various sizes, an inverted U-shaped housing fixedly secured to said base, said housing having side walls and a top wall, said top wall having an opening therein to permit flow of material therethrough, guides on said side walls for supporting trays thereon, and at least one portion of said base having openings therein to permit flow of material therethrough.

2. A service wagon as set forth in claim 1 including a shelf member supported by said base, said posts extending upwardly from said shelf member, said posts including two substantially C-shaped members and two substantially L-shaped members.

3. A service wagon as set forth in claim 1 including a garbage receptacle supported by the underside of said base, said garbage receptacle being beneath the portion of the base having openings therein to collect material which flows through said openings.

4. A service wagon as set forth in claim 1 including a receptacle removably connected to the exterior of one of said side walls of said housing, and a guard member frictionally secured to the base of said service wagon and extending therearound.

5. A service wagon as set forth in claim 2 including a circular plate fixedly secured to said shelf member, said circular plate having a flange extending upwardly therefrom, said circular plate and flange adapted to receive a cylindrical receptacle which cooperates with said C-shaped posts and one of said side walls to define various size openings therebetween in which plates may be stacked.

6. A service wagon as set forth in claim 1 including a stepped portion on the top wall of said housing, said stepped portion defining a recess, a tray adapted to be received within said recess, said tray having openings in the bottom thereof to permit flow of material therethrough.

7. A service wagon as set forth in claim 6 wherein a plurality of trays are adapted to be supported by the guides on said side walls, said trays having openings in the bottoms thereof to permit flow of material therethrough.

8. A service wagon as set forth in claim 1 including a back wall on said housing, an end wall secured to said base and extending upwardly therefrom, said end wall having chordal segments connected thereto for cooperation with said posts to define two of said openings, and a handle connected to the exterior of one of said side walls of said housing to facilitate movement of said wagon.

9. A mobile food service wagon comprising a frame including a base mounted on wheels, means extending upwardly from a portion of said base defining various sized openings therebetween for accommodating plates of various sizes, support means attached to a portion of said base for supporting a plurality of trays thereon, receptacle means beneath a portion of said base and supported by said base, said receptacle means adapted to receive flowable material therein, and a further receptacle means supported by said base for receiving material therein.

References Cited

UNITED STATES PATENTS

| | | | |
|---|---|---|---|
| 2,319,589 | 5/1943 | Drinkwater | 280—47.35 |
| 2,845,780 | 8/1958 | Conklin | 211—126 X |
| 3,162,462 | 12/1964 | Elders | 280—47.35 |
| 3,199,683 | 8/1965 | Graswich | 211—126 X |
| 3,209,711 | 10/1965 | Pope | 211—126 X |

NILES C. BYERS, JR., Primary Examiner

U.S. Cl. X.R.

280—47.35; 296—22